S. A. MOODY.
Sod-Cutter.
No. 58,951. Patented Oct. 16. 1866
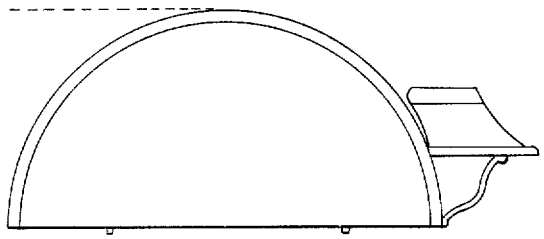
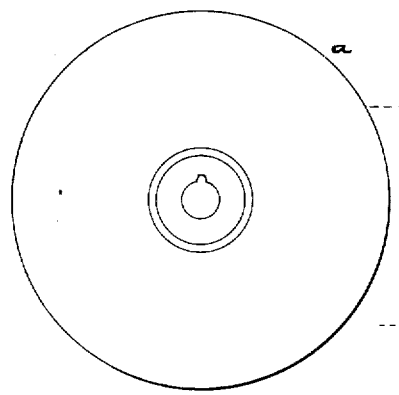
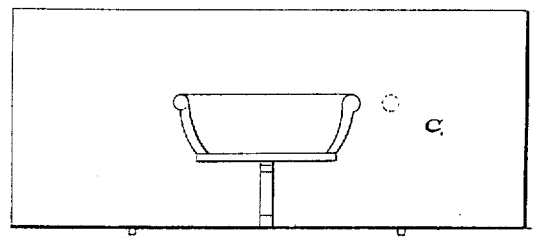
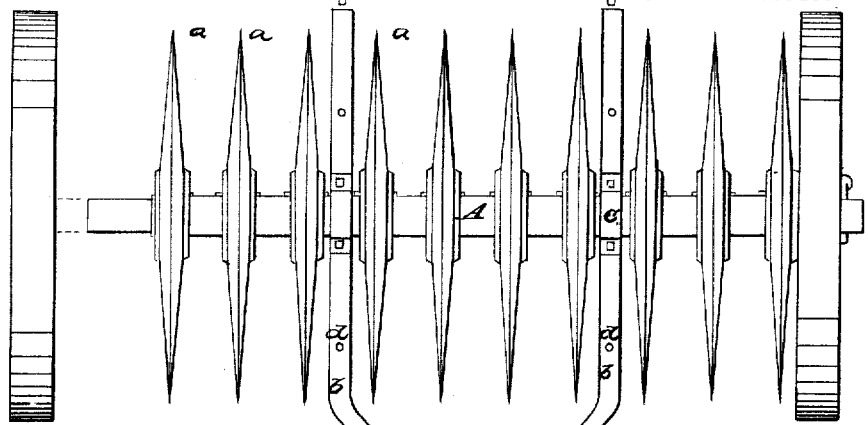

UNITED STATES PATENT OFFICE.

SILAS A. MOODY, OF SAN FRANCISCO, CALIFORNIA, ASSIGNOR TO PHILLIP E. DIVINE.

IMPROVEMENT IN SOD-CUTTERS.

Specification forming part of Letters Patent No. 58,951, dated October 16, 1866.

*To all whom it may concern:*

Be it known that I, SILAS A. MOODY, of the city and county of San Francisco, State of California, have invented a certain new and useful Sod-Cutter for cultivating the soil; and I hereby declare the following description and accompanying drawings are sufficient to enable any person skilled in the art or science to which it most nearly appertains to make and use my said invention without further invention or experiment.

The nature of my invention consists in the employment of a series of circular blades or wheels placed at suitable distances apart upon a horizontal shaft or axle, which, by their weight, sink into the ground, and are drawn through the field, cutting the sward longitudinally and at right angles as fine as desired.

Referring to the drawings, Figure 1 represents a plan of my sod-cutter; Fig. 2, elevation of driver's seat and cover; Fig. 3, end view of same; Fig. 4, plan of cutter or blade.

The preparation of soil composed upon its surface of sod or green sward fit for the seed is attended with a greater or less degree of difficulty, on account of its being held together so completely by the roots or fibers of grasses. Especially is this the case in old fields and prairie ground which have long remained unbroken; and when turned up by the plow alone the sod is thrown over in one unbroken clod, held closely together by the roots of the grass, which, in order to be fittingly prepared for the seed, a laborious and tedious process of harrowing must be gone through with, which only partially accomplishes the object sought to be attained, leaving the surface inverted sod untouched, to sprout up and exhaust the strength of the soil, as well as causing great additional labor to the husbandman to keep down the uprising shoots.

For cutting the sod or sward into sections of the desired size before plowing or otherwise, and enabling the farmer to pulverize the soil more readily and with much less time than by harrowing or otherwise, and preparing his land for cultivation with greater ease than before, are the objects of my invention.

In the drawings, A represents a horizontal axle, upon which I place circular wheels or knives $a\ a\ a\ a$, with sharp edges. These circular knives are keyed to the shaft at such intervals of space as is desired, according to the width to be cut.

The attachment for propelling or drawing is had by means of the arms $b\ b$ of the pole B to the axle underneath it, which revolves in boxes $c\ c$. Between this fork about one-third of the length of the axle is embraced, or sufficient space to regulate the evenness of the draft by the pole.

The blades or knives may be taken off or put onto the axle by measurement, so as to avoid all lateral draft after uncoupling the boxes, which leaves the axle free from obstructions.

For providing a seat for the driver I employ a half-circular covering, C, which covers that portion of the knives above the fork of the pole, in which it is held by means of pins fitting into holes $d\ d$. This cover may be loaded in case a sufficient weight is not obtained or a greater depth of the blades is desired.

For the greater convenience of drawing my machine from field to field I employ two wheels, D D, somewhat greater in diameter than those of the blades themselves. These wheels are placed upon each end of the axle in the usual way, kept in place by pins, and are to be removed before the machine is set in motion.

The operation of my machine is as follows: The knives having been arranged on the axle at the distance apart desired, the machine is set in motion, the axle which carries the blades or knives turning in the bearings attached to the arms of the pole, cutting the field longitudinally or at right angles, or both, if a finer pulverization is wanted. The same effect may be had by attaching the blades in sections to radial arms, the blades to be sharpened at their sides.

Having thus described my machine for cutting sod or greensward, what I claim as my invention and improvement is—

A series of circular blades or knives upon a shaft or axle arranged to rotate as described, in combination with the cover C and seat upon the cover, substantially as described.

In witness whereof I have hereunto set my hand and seal.

S. A. MOODY. [L. S.]

Witnesses:
C. W. M. SMITH,
I. N. GARTHWAIT.